United States Patent
He

(10) Patent No.: US 11,903,036 B2
(45) Date of Patent: Feb. 13, 2024

(54) METHOD FOR DETERMINING RANDOM ACCESS RESOURCE, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 143 days.

(21) Appl. No.: 17/535,477

(22) Filed: Nov. 24, 2021

(65) Prior Publication Data
US 2022/0086922 A1    Mar. 17, 2022

Related U.S. Application Data

(63) Continuation of application No. PCT/CN2019/091390, filed on Jun. 14, 2019.

(51) Int. Cl.
*H04W 74/08* (2009.01)
*H04L 27/26* (2006.01)
(Continued)

(52) U.S. Cl.
CPC ....... *H04W 74/0841* (2013.01); *H04L 5/0051* (2013.01); *H04L 27/26025* (2021.01); *H04W 56/001* (2013.01); *H04W 74/0866* (2013.01)

(58) Field of Classification Search
CPC .......... H04W 74/0841; H04W 56/001; H04W 74/0866; H04W 74/0833; H04W 56/00;
(Continued)

(56) References Cited

U.S. PATENT DOCUMENTS

| 2019/0159175 A1 | 5/2019 | Islam et al. | |
| 2020/0037293 A1* | 1/2020 | Reial | H04W 48/08 |
| 2022/0060974 A1* | 2/2022 | Zeng | H04W 48/16 |

FOREIGN PATENT DOCUMENTS

| CN | 109041593 A | 12/2018 |
| CN | 109451867 A | 3/2019 |

(Continued)

OTHER PUBLICATIONS

Vivo R1-1904066: Discussion on enhancements to initial access procedure Apr. 2019 (Year: 2019).*

(Continued)

*Primary Examiner* — Rina C Pancholi
(74) *Attorney, Agent, or Firm* — Sheppard, Mullin, Richter & Hampton LLP

(57) ABSTRACT

The embodiments of the present application relate to a method for determining a random access resource, a terminal device, and a network device. The method includes: determining, by a terminal device, Quasi Co-Located (QCL) information or position information of a target Synchronization Signal Block (SSB); and determining, by the terminal device, a set of target random access resources corresponding to the target SSB based on a correspondence between QCL information or position information of SSBs and sets of random access resources. A random access resource in the set of target random access resources is used for the terminal device to perform a random access process. The position indexes of at least two SSBs with a QCL relationship in the correspondence correspond to a same set of random access resources.

20 Claims, 5 Drawing Sheets

(51) Int. Cl.
*H04L 5/00* (2006.01)
*H04W 56/00* (2009.01)

(58) Field of Classification Search
CPC ............. H04L 5/0051; H04L 27/26025; H04L 27/26136; H04L 5/0048; H04L 5/001
See application file for complete search history.

(56) References Cited

FOREIGN PATENT DOCUMENTS

| | | |
|---|---|---|
| CN | 109565432 A | 4/2019 |
| CN | 109802805 A | 5/2019 |

OTHER PUBLICATIONS

Zte R1-1905952 Discussion on enhancement of initial access procedures for NR-U May 2019 (Year: 2019).*
The Second Office Action from corresponding Chinese Application No. 202111671249.1, dated Mar. 27, 2023 . English translation attached.
Communication pursuant to Article 94(3) EPC for European Application 19932318.9 dated Mar. 3, 2023.
Extended European Search Report dated Apr. 28, 2022 received in European Patent Application No. EP19932318.9.
Zte et al.: "Discussion on enhancement of initial access procedures for NR-U" , 3GPP Draft; R1-1905952 Enhancement of the Initial Access Procedure , 3rd Generation Partnership Project (3GPP) , Mobile Competence Centre ; 650 , Route Des Lucioles ; F-06921 Sophia-Antipolis Cedex ; FRA vol. RAN WG1 , No. Reno , USA; May 13, 2019-May 17, 2019 May 13, 2019 (May 13, 2019) , XP051727409.
Oppo: "Enhancements to initial access procedure for NR-U" , 3GPP Draft; R1-1904895 , 3rd Generation Partnership Project (3GPP) , Mobile Competence Centre ; 650 , Route Des Lucioles ; F-06921 Sophia-Antipolis Cedex ; France vol. RAN WG1 , No. Xi'an, China; Apr. 8, 2019-Apr. 12, 2019, Mar. 30, 2019 (Mar. 30, 2019) , XP051691844.
Vivo: "Discussion on enhancements to initial access procedure" ,3GPP Draft; R1-1906131 Discussion on Initial Access Procedure for NR-U, 3RD Generation Partnership Project (3GPP) ,Mobile Competence Centre ; 650 , Route Des Lucioles ; F-06921 Sophia-Antipolis Cedex vol. RAN WG1, No. Reno , USA; May 13, 2019-May 17, 2019 May 13, 2019 (May 13, 2019) , XP051727587.
First Examination Report dated Jun. 13, 2022 received in Indian Patent Application No. IN202127058817.
International Search Report and Written Opinion dated Feb. 26, 2020 in International Application No. PCT/CN2019/091390. English translation attached.
3GPP. "Discussion on enhancements to initial access procedure", TSG RAN WG1 #96bis, R1-1904066, Apr. 12, 2019 (Apr. 12, 2019), section 2.1.2 and section 2.3.3., 10 pages.
3GPP. 3rd Generation Partnership Project; Technical Specification Group Radio Access Network; NR; "Physical layer procedures for control(Release 15)", 3GPP TS 38.213 V15.2.0, Jun. 2018, 99 pages.
First Office Action from corresponding Chinese Application No. 2021116712491, dated Jan. 13, 2023 . English translation attached.
Exam Report, Communication pursuant to Article 94(3) EPC, dated Dec. 5, 2022 received in European Patent Application No. EP 19932318.9.
LG Electronics Inc, 3GPP TSG-RAN WG2 Meeting #103bis Chengdu, China, Oct. 8-12, 2018, R2-1815457,"Correction on RA resource selection", Sep. 27, 2018.
The Third Office Action from corresponding Chinese Application No. 202111671249.1, dated May 30, 2023. English translation attached.
The Grant Notice from corresponding Chinese Application No. 202111671249.1, dated Jul. 26, 2023. English translation attached.
Grant Notice, Communication under Rule 71(3) EPC for European Application No. 19932318.9 dated Jul. 13, 2023.

* cited by examiner

METHOD FOR DETERMINING RANDOM ACCESS RESOURCE, TERMINAL DEVICE, AND NETWORK DEVICE

CROSS-REFERENCE TO RELATED APPLICATION

The present application is a continuation of International Application No. PCT/CN2019/091390, filed on Jun. 14, 2019, the entire contents of which are incorporated herein by reference.

TECHNICAL FIELD

The present application relates to the field of communication, and more particularly, to a method for determining a random access resource, a terminal device, and a network device.

BACKGROUND

In New Radio (NR), an index of a Synchronization Signal Block (SSB)/Physical Broadcast Channel (PBCH) Block can be used to obtain synchronization and a Quasi Co-Located (QCL) relationship. A Physical Random Access Channel (PRACH) resource associated with each SSB index in a cell can also be obtained directly based on an SSB index, a Random Access Channel (RACH) resource configuration of the cell, and a mapping relationship between SSB indexes and PRACH resources.

In an NR-Unlicensed (NR-U) system, signal transmissions need to be performed based on a principle of Listen Before Talk (LBT). That is, channel listening needs to be performed before a signal can be transmitted. The signal can be transmitted only when a listening result indicates that a channel is idle and cannot be transmitted when the listening result indicates that the channel is busy. Therefore, there can be a plurality of SSB candidate transmission positions, resulting in that a position index of an SSB may be different from a QCL index. That is, the SSB may be indicated by the SSB position index, by which the terminal device may obtain synchronization. The QCL relationship may be obtained based on an SSB QCL index. Therefore, it is currently a problem to be solved regarding how to indicate the SSB to determine a corresponding PRACH resource.

SUMMARY

In a first aspect, a method for determining a random access resource is provided. The method includes: determining, by a terminal device, QCL information of a target SSB; and determining, by the terminal device, a set of target random access resources corresponding to the QCL information of the target SSB based on a correspondence between QCL information of SSBs and sets of random access resources. A random access resource in the set of target random access resources is used for the terminal device to perform a random access process.

In a second aspect, a method for determining a random access resource is provided. The method includes: determining, by a terminal device, a position index of a target SSB; and determining, by the terminal device, a set of target random access resources corresponding to the position index of the target SSB based on a correspondence between position indexes of SSBs and sets of random access resources. A random access resource in the set of target random access resources is used for the terminal device to perform a random access process, the position indexes of at least two SSBs correspond to one set of random access resources in the correspondence, and the at least two SSBs have a QCL relationship.

In a third aspect, a method for determining a random access resource is provided. The method includes: determining, by a network device, QCL information of a target SSB; and determining, by the network device, a set of target random access resources corresponding to the QCL information of the target SSB based on a correspondence between QCL information of SSBs and sets of random access resources. A random access resource in the set of target random access resources is used for the network device to receive a RACH.

In a fourth aspect, a method for determining a random access resource is provided. The method includes: determining, by a network device, a position index of a target SSB; and determining, by the network device, a set of target random access resources corresponding to the position index of the target SSB based on a correspondence between position indexes of SSBs and sets of random access resources. A random access resource in the set of target random access resources is used for the network device to receive a RACH, the position indexes of at least two SSBs correspond to one set of random access resources in the correspondence, and the at least two SSBs have a QCL relationship.

In a fifth aspect, a terminal device is provided. The terminal device is configured to perform the method according to any of the above first to second aspects or any embodiment thereof. Specifically, the terminal device includes one or more functional modules for performing the method according to any of the above first to second aspects or any embodiment thereof.

In a sixth aspect, a network device is provided. The network device is configured to perform the method according to any of the above third to fourth aspects or any embodiment thereof. Specifically, the network device includes a functional module for performing the method according to any of the above third to fourth aspects or any embodiment thereof.

In a seventh aspect, a terminal device is provided. The terminal device includes a processor and a memory. The memory is configured to store a computer program. The processor is configured to invoke and run the computer program stored in the memory to perform the method according to any of the above first to second aspects or any embodiment thereof.

In an eighth aspect, a network device is provided. The network device includes a processor and a memory. The memory is configured to store a computer program. The processor is configured to invoke and run the computer program stored in the memory to perform the method according to any of the above third to fourth aspects or any embodiment thereof.

In a ninth aspect, a chip is provided. The chip is configured to perform the method according to any of the above first to fourth aspects or any embodiment thereof. Specifically, the chip includes a processor configured to invoke and run a computer program from a memory, whereby an apparatus provided with the chip is operative to perform the method according to any of the above first to fourth aspects or any embodiment thereof.

In a tenth aspect, a computer-readable storage medium is provided. The computer-readable storage medium is configured to store a computer program. The computer program causes a computer to perform the method according to any of the above first to fourth aspects or any embodiment thereof.

In an eleventh aspect, a computer program product is provided. The computer program product includes computer program instructions. The computer program instructions cause a computer to perform the method according to any of the above first to fourth aspects or any embodiment thereof.

In a twelfth aspect, a computer program is provided. The computer program, when running on a computer, causes a computer to perform the method according to any of the above first to fourth aspects or any embodiment thereof.

DESCRIPTION OF EMBODIMENTS

The technical solutions in the embodiments of the present application will be described below with reference to the figures in the embodiments of the present application. Obviously, the described embodiments are only some embodiments, rather than all embodiments, of the present application. All other embodiments obtained by those skilled in the art based on the embodiments in the present application without inventive efforts are to be encompassed by the scope of the present application.

The technical solutions according to the embodiments of the present application can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, Universal Mobile Telecommunication System (UMTS), Worldwide Interoperability for Microwave Access (WiMAX) communication system, or the $5^{th}$ Generation (5G) communication system.

Figure 1:
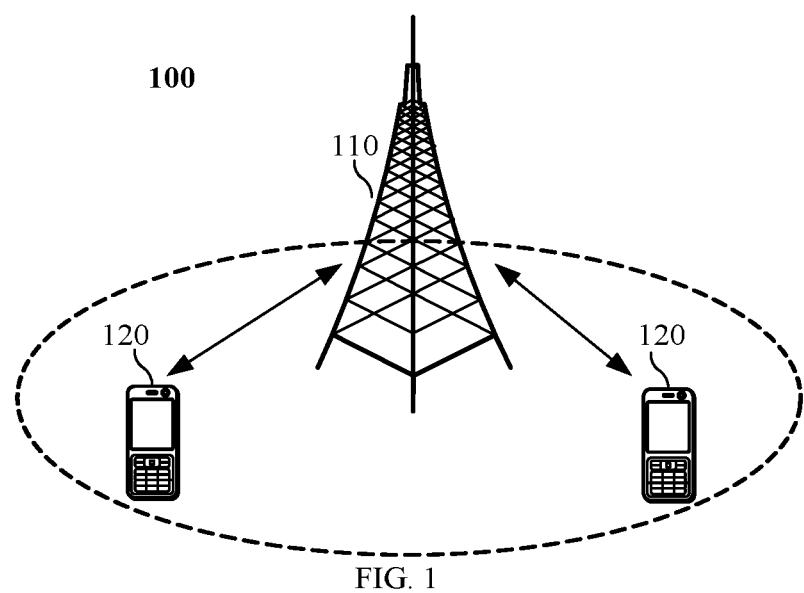
FIG. 1 is a schematic diagram illustrating an architecture of a communication system according to an embodiment of the present application.

As an example, a communication system 100 where an embodiment of the present application can be applied is shown in FIG. 1. The communication system 100 may include a network device 110. The network device 110 may be a device that can communicate with a terminal device (or referred to as communication terminal or terminal) 120. The network device 110 may provide communication coverage for a particular geographic area and may communicate with terminal devices located in the coverage area. Optionally, the network device 110 may be a base station such as Base Transceiver Station (BTS) in a GSM system or a CDMA system, a base station such as NodeB (NB) in a WCDMA system, a base station such as Evolutional Node (eNB or eNodeB) in an LTE system, or a radio controller in a Cloud Radio Access Network (CRAN). Alternatively, the network device 110 may be a mobile switch center, a relay station, an access point, a vehicle-mounted device, a wearable device, a hub, a switch, a network bridge, a router, a network side device in a 5G network, or a network device in a future evolved Public Land Mobile Network (PLMN).

The communication system 100 further includes at least one terminal device 120 located within the coverage of the network device 110. As used herein, the term "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user. Device.

Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

Optionally, direct communication, such as Device to Device (D2D) communication, may be performed between the terminal devices 120.

Optionally, the 5G system or network may also be referred to as a New Radio (NR) system or network.

FIG. 1 exemplarily shows one network device and two terminal devices. Optionally, the communication system 100 may include a plurality of network devices and the coverage of each network device may include a different number of terminal devices. The embodiment of the present application is not limited to this.

Optionally, the communication system 100 may also include other network entities such as a network controller and a mobility management entity, and the embodiment of the present application is not limited to this.

It can be appreciated that, in the embodiment of the present application, a device with a communication function in a network/system may be referred to as a communication device. For the communication system 100 shown in FIG. 1 as an example, communication devices may include the network device 110 and the terminal devices 120, each having a communication function. The network device 110 and the terminal devices 120 may be e.g., any of the specific devices described above, and details thereof will be omitted here. The communication device may also include other devices in the communication system 100, such as a network controller, a mobility management entity, and other network entities, and the embodiment of the present application is not limited to this.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

Some concepts involved in the embodiments of the present application will be described in detail below.

1. NR-U System

An unlicensed frequency spectrum is a spectrum allocated by countries and regions for radio device communication. The spectrum is generally considered to be a shared spectrum. That is, communication devices in different communication systems can use the spectrum as long as they meet regulatory requirements set by corresponding countries or regions on the spectrum, without having to apply for proprietary spectrum authorization from governments. In order to allow various communication systems that use an unlicensed frequency spectrum for wireless communication to coexist friendly on the unlicensed frequency spectrum, some countries or regions have stipulated legal requirements that must be met when using the unlicensed frequency spectrum. For example, in Europe, a communication device follows the "LBT" principle. That is, a communication device needs to perform channel listening before transmitting a signal on a channel of the unlicensed frequency spectrum. Only when a result of the channel listening indicates that the channel is idle, the communication device can transmit a signal on the channel. When the result of the channel listening of the communication device on the channel of the unlicensed frequency spectrum indicates that the channel is busy, the communication device cannot transmit any signal on the channel. In addition, in order to ensure fairness, in one transmission, a time duration in which the communication device uses the channel of the unlicensed frequency spectrum for signal transmission cannot exceed Maximum Channel Occupation Time (MCOT).

2. SS/PBCH Blocks in the NR System

Common channels and signals, such as synchronization signals and broadcast channels, in the NR system need to cover an entire cell by means of multi-beam sweeping to facilitate reception by UEs in the cell. Multi-beam transmission of the synchronization signals is achieved by defining an SS/PBCH burst set. One SS burst set includes one or more SS/PBCH Blocks. Each SS/PBCH Block is used to carry a synchronization signal and a broadcast channel of one beam. Therefore, one SS/PBCH burst set can include synchronization signals of a number (equal to the number of SS/PBCH Blocks in the cell) of beams. A maximum value of the number of SS/PBCH Blocks can be denoted as L, which is dependent on a frequency band of the system. For example, if a frequency range is smaller than or equal to 3 GHz, L is 4; if the frequency range is 3 GHz-6 GHz, L is 8; and if the frequency range is 6 GHz-52.6 GHz, L is 64.

Figure 2:
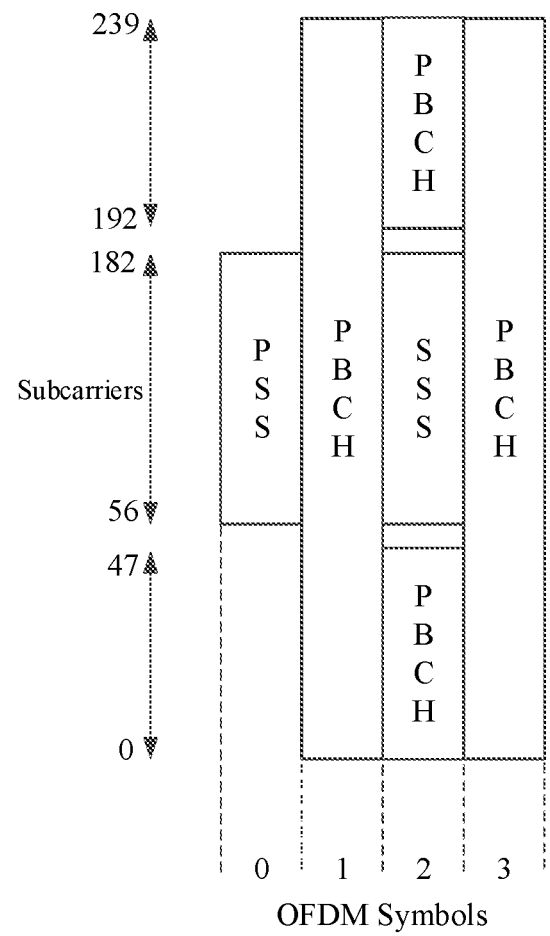
FIG. 2 a schematic diagram illustrating time-frequency resources occupied by an SSB according to an embodiment of the present application.

FIG. 2 is a schematic diagram illustrating time-frequency resources occupied by an SS/PBCH Block (hereinafter referred to as "SSB" for short). As illustrated in FIG. 2, one SSB may include a Primary Synchronization Signal (PSS) of one Orthogonal Frequency Division Multiplexing (OFDM) symbol, a Secondary Synchronization Signal (SSS) of one OFDM symbol, and an NR-PBCH of two OFDM symbols. The time-frequency resources occupied by the PBCH may include a Demodulation Reference Signal (DMRS), which is used for demodulation of the PBCH.

All SS/PBCH Blocks in the SS/PBCH burst set are transmitted within a 5 ms time window and are transmitted repeatedly at a certain period. This period can be configured by a higher layer parameter, SSB-timing information. For example, the period can include 5 ms, 10 ms, 20 ms, 40 ms, 80 ms, 160 ms, or the like. For the UE, an index of the SSB can be obtained from the received SS/PBCH Block. The SSB index corresponds to a relative position of the SSB within the 5 ms time window. The UE can obtain frame synchronization based on the information and half-frame indication information carried in the PBCH. Here, the index of the SS/PBCH Block can be indicated by the DMRS of the PBCH or information carried by the PBCH.

Figure 3:
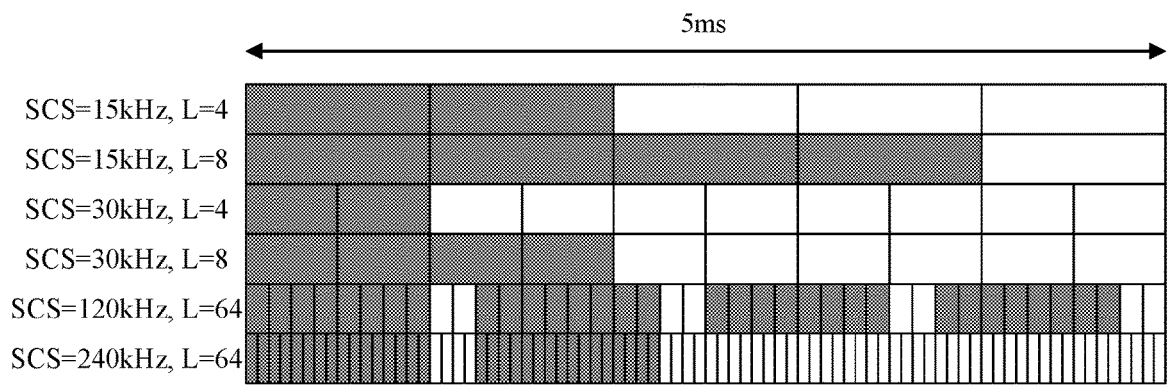
FIG. 3 shows a slot distribution pattern of SSBs for different Subcarrier Spacings (SCSs) according to an embodiment of the present application.

FIG. 3 shows a slot distribution pattern of SSBs for different SCSs according to an embodiment of the present application. For a 15 kHz SCS and L=4 as an example, one slot includes fourteen symbols, and can carry two SS/PBCH Blocks. A total of four SS/PBCH Blocks are distributed in the first two slots within the 5 ms time window.

It can be appreciated that the number L of SSBs according to an embodiment of the present application is the maximum number of SSBs. That is, a number of SSBs actually transmitted may be smaller than or equal to L. In the NR system, since L is the maximum number of SSBs transmitted in a certain frequency band, a value range of the SSB indexes is [0, L−1]. The SSB indexes can be used for frame synchronization. On the other hand, the SSB indexes can also be used by the UE to obtain a QCL relationship of the SSBs. If indexes of SS/PBCH Blocks received at different time are the same, it is considered that the SS/PBCH Blocks have the QCL relationship.

When two reference signals (such as SSBs) have the QCL relationship, it can be determined that large-scale parameters of the two reference signals can be inferred from each other or can be determined to be similar. The large-scale parameters may include, for example, a Doppler delay, an average delay, and a spatial reception parameter, etc. During measurement, the UE can filter the SSBs with the QCL relationship, and the filtered SSBs are regarded as a measurement result at a beam level.

3. Discovery Reference Signal (DRS) in NR-U System

In the NR-U system, for a Primary Cell (Pcell), a DRS transmitted by the network device can be used for access and measurement. The DRS may include at least the SSB. In consideration of the uncertainty in obtaining channel access on the unlicensed frequency spectrum, the network device may not be able to successfully transmit the SSB at predetermined time due to a possibility of an LBT failure for transmission of the SSB. Therefore, the NR-U defines candidate positions of the SSB. For example, in a time window of up to 5 ms, for the SSB having the SCS of 30 kHz, twenty candidate positions are defined; and for the SSB having the SCS of 15 kHz, ten candidate positions are defined. The maximum number of transmitted SSBs is Q. A base station determines to use Q candidate positions out of the plurality of candidate positions to transmit the DRS based on an LBT detection result in a transmission window of the DRS. The parameter Q may be configured by the network device for the terminal device, or may be specified by a protocol, and the embodiment of the present application is not limited to any of these examples.

Figure 4:
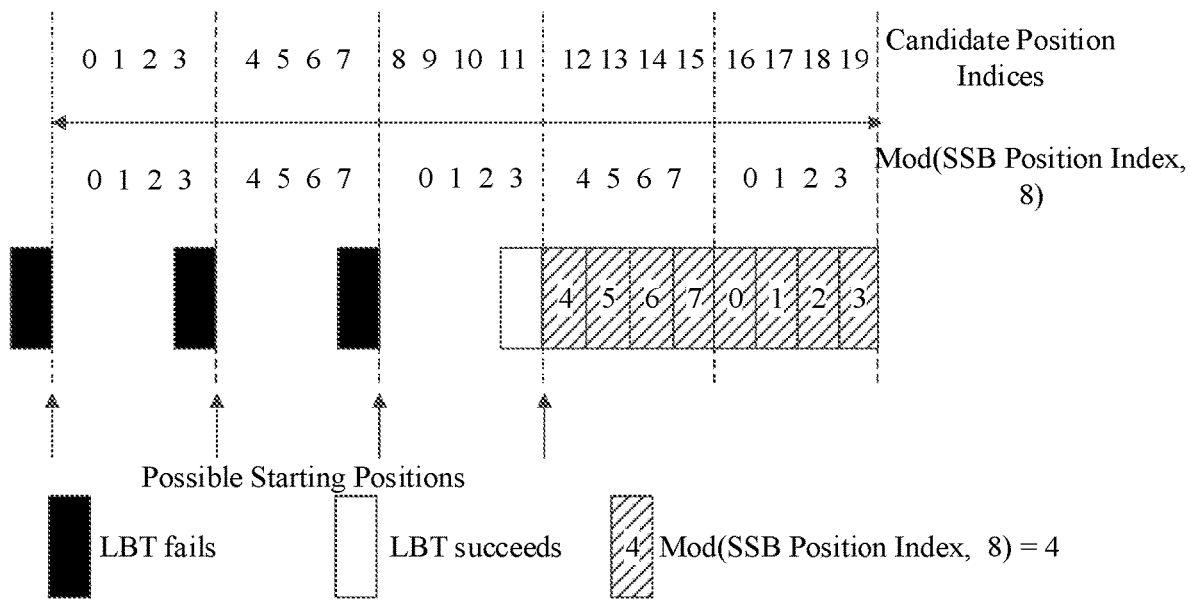
FIG. 4 is a schematic diagram illustrating LBT performed at a plurality of candidate positions according to an embodiment of the present application.

FIG. 4 is a schematic diagram illustrating LBT performed at candidate positions. As illustrated in FIG. 4, a description is given with reference to an example where an SCS is 30 kHz and twenty candidate positions are defined. The maximum number Q of transmitted SSBs is eight. Correspondingly, possible starting positions of the eight SSBs can be any one of the twenty candidate positions illustrated in FIG. 4. It is assumed here that the base station only performs LBT at candidate positions with indexes of 1, 4, 8, and 16, as illustrated in FIG. 4. That is, the four positions are determined as possible starting positions of the eight SSBs. As illustrated in FIG. 4, assuming that the base station succeeds in LBT before the candidate position 12, transmission of SSB QCL indexes 0-7 can be started accordingly.

The SSB QCL index in the NR-U has a different meaning from the SSB index in the NR. In the NR, the SSB index can be used to obtain synchronization and the QCL relationship, whereas in the NR-U, synchronization is obtained based on the SSB position index, and the QCL relationship is obtained based on the SSB QCL index.

As illustrated in FIG. 4, depending on the time at which the LBT succeeds, an actual transmission position of the SSB may be any one or more of the twenty candidate positions. For an SSB transmission mode defined in the NR-U, since the UE needs to obtain frame synchronization based on the SSBs received at the candidate transmission positions, the SSB position indexes need to be defined for the candidate transmission positions. For example, for the maximum number of transmitted SSBs Q=8 and the number of candidate positions Y=20 as an example, since up to eight SSBs may be transmitted at the twenty candidate positions, the SSB position indexes carried by the SSBs need to be extended to 0 to 19, such that the UE can obtain positions of the received SSBs, and further obtain frame synchronization. Since the maximum number of transmitted SSBs is eight, the value range of the SSB QCL indexes used to obtain the QCL relationship between the SSBs is 0 to 7. That is, value range of the SSB position indexes and the value range of the SSB QCL indexes are different. For SSBs transmitted at different time, if their SSB QCL indexes are the same, it is determined that they have the QCL relationship. That is, there is no QCL relationship between SSBs with different SSB QCL indexes. Here, SSB QCL index=Mod (SSB position index, Q), and the value range of the SSB QCL indexes is 0 to Q−1.

Figure 5:
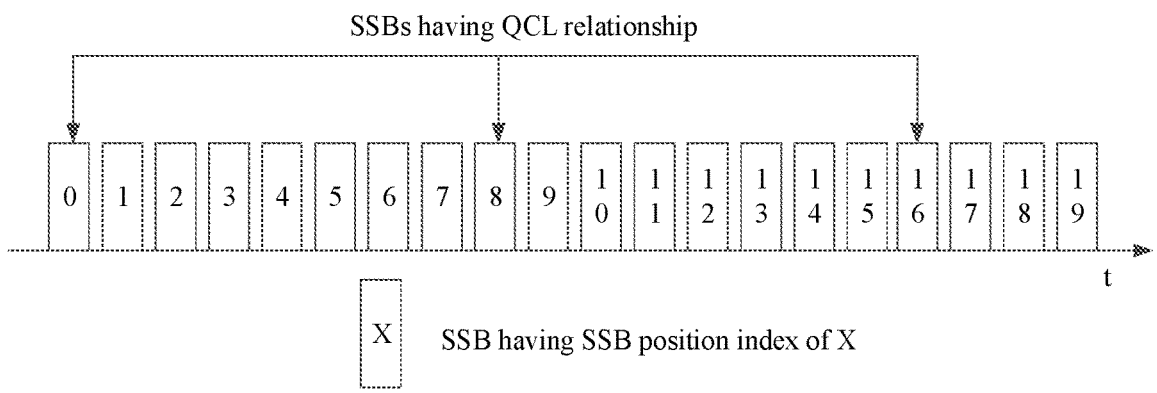
FIG. 5 is a schematic diagram illustrating a QCL relationship of SSBs having different position indexes according to an embodiment of the present application.

FIG. 5 illustrates a QCL relationship of SSBs having different position indexes. As illustrated in FIG. 5, assuming that there are twenty candidate positions for transmitting SSBs, the value range of the position indexes is 0-19, and the maximum number of transmitted SSBs is eight, i.e., the value range of the SSB QCL indexes for obtaining the QCL relationship among SSBs is 0-7, there may be SSBs with different position indexes but with the QCL relationship. For example, as illustrated in FIG. 5, three SSBs with the SSB position indexes of 0, 8, and 16 all have the QCL relationship.

4. Random Access (RA) Process

In the NR technology of Release 15 (Rel-15), a RACH resource configured for an accessing UE is defined, which includes a total of 256 configurations. RACH resource configuration information used by a cell is indicated to an accessing UE in a system message. Here, each RACH resource configuration may include at least one of a preamble format, a period, a radio frame offset, a subframe number within a radio frame, a starting symbol within a subframe, a number of PRACH slots within a subframe, a number of PRACH occasions within a PRACH slot, and a duration of a PRACH occasion. From the indicated information, time information, frequency information, and code information of the PRACH resource can be determined. As illustrated in Table 1, for the PRACH configuration index of 86 as an example, parameters such as the preamble format, the radio frame where the PRACH occasion is located, the subframe, the starting symbol, and a time length are shown.

TABLE 1

| PRACH configuration index | Preamble format | $n_{SFN}$ mod x = y | | Subframe No. | Starting symbol within subframe | Amount of PRACH slots within subframe | Amount of PRACH occasions within PRACH slot | Duration of PRACH occasion |
|---|---|---|---|---|---|---|---|---|
| | | X (Period) | Y (Offset) | | | | | |
| 86 | A1 | 1 | 0 | 0-9 | 7 | 1 | 3 | 2 |

For the UE, on a basis of the RACH resource configuration indicated by the system message, an association relationship between SSBs and PRACH resources also needs to be indicated, such that the UE can determine RACH resources it can use based on detected SSBs and the association relationship. Each SSB is associated with one or more PRACH occasions and is also associated with a plurality of contention based preambles. That is, the index of each SSB is associated with a part of specific resources in the RACH resource configuration indicated by the system message.

Figure 6:
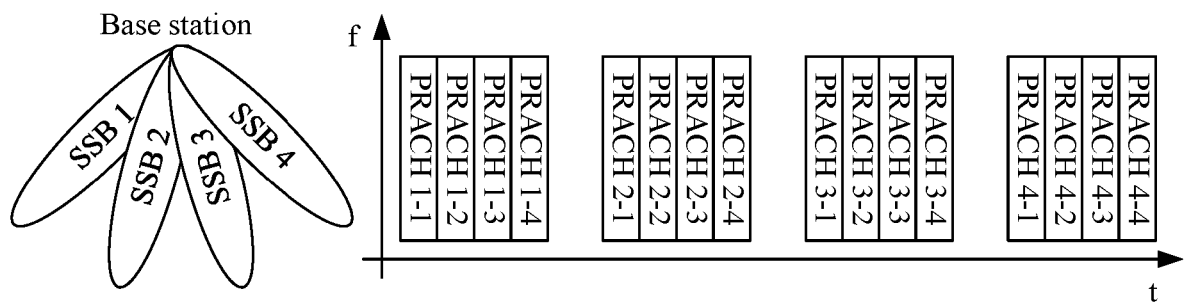
FIG. 6 a schematic diagram illustrating PRACH occasions associated with a plurality of SSBs according to an embodiment of the present application.

For example, FIG. 6 is a schematic diagram illustrating PRACH occasions associated with a plurality of SSBs included in a base station. As illustrated in FIG. 6, among four SSBs of the base station, one SSB may be associated with four PRACH occasions. In addition, one SSB may also be associated with a number, e.g., four, eight, twelve or more, of contention based preambles, and so on. A total number of contention based preambles in one PRACH occasion is CB-preambles-per-SSB*max(1, SSB-per-rach-occasion), where CB-preambles-per-SSB represents a number of contention based preambles included in each SSB, and SSB-per-rach-occasion represents a number of SSBs corresponding to each RACH occasion. For example, if one SSB is associated with four PRACH occasions and four contention based preambles, a total number of contention based preambles in one PRACH occasion is CB-preambles-per-SSB*max(1, SSB per-Tach-occasion)=4*max(1,1/4)=4.

The RA process can be mainly divided into two different modes: Contention based RACH (CBRA) process and Contention-Free based RACH (CFRA) process.

Figure 7:
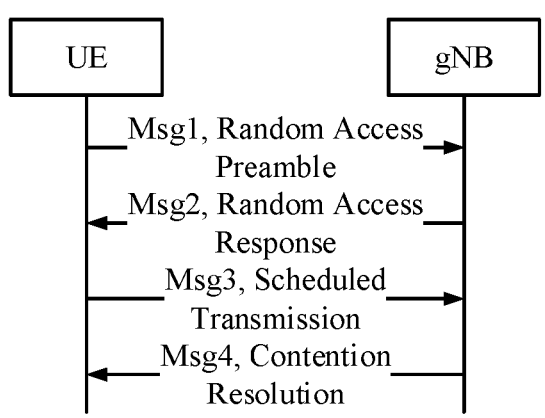
FIG. 7 is a flowchart illustrating a contention based random access process according to an embodiment of the present application.

Specifically, FIG. 7 is a flowchart illustrating the CBRA process. As illustrated in FIG. 7, the CBRA process mainly includes the following steps. At Step 1, PRACH preamble (Msg1) transmission, i.e., the UE transmits an Msg1. That is, the UE transmits a random access preamble to a gNB. At Step 2, random access response (Msg2), i.e., the gNB transmits an Msg2. That is, the gNB transmits a random access response to the UE. At Step 3, scheduled uplink transmission (Msg3), i.e., the UE transmits an Msg3. That is, the UE initiates an RA process to the gNB, and performs scheduled transmission over a random access resource. At Step 4, contention resolution (Msg4), i.e., the gNB transmits an Msg4. That is, the gNB resolves a problem of resource conflicts for the UE.

Figure 8:
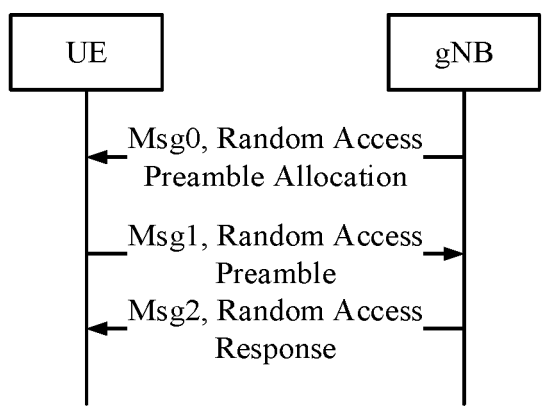
FIG. 8 is a flowchart illustrating a contention-free based random access process according to an embodiment of the present application.

FIG. 8 is a flowchart illustrating the CFRA process. As illustrated in FIG. 8, the CFRA process is triggered by a base station transmitting a Physical Downlink Control Channel (PDCCH) order to a UE and may specifically include the following steps. At Step 1, PRACH preamble allocation (Msg0), i.e., a gNB transmits an Msg0. That is, the gNB transmits an RA preamble assignment to a UE. At Step 2, RACH preamble transmission (Msg1), i.e., the UE transmits an Msg1. That is, the UE transmits a random access preamble to the gNB. At Step 3, random access response (Msg2), i.e., the gNB transmits an Msg2. That is, the gNB transmits a random access response to the UE. The PDCCH order can also be used to instruct the UE to use a dedicated CFRA resource configuration carried in the PDCCH order to initiate the RACH process.

In the NR, the SSB index can be used to obtain synchronization and the QCL relationship. The PRACH resource associated with each SSB index in the cell is also obtained directly based on the SSB index, the RACH resource configuration of the cell, and a mapping relationship between SSB indexes and PRACH resources. In the NR-U, the SSB is usually indicated by the SSB position index, and the UE obtains synchronization based on the SSB position index. The QCL relationship is obtained based on the SSB QCL index, which is usually obtained by calculation based on the SSB position index and the parameter Q. Therefore, it is currently a problem to be solved regarding how to indicate the SSB to determine a corresponding PRACH resource.

If the SSB index defined in the NR system continues to be used, i.e., the PRACH resource is determined based on the SSB position index, each SSB position index is independently associated with the PRACH resource, resulting in a waste of PRACH resources. In fact, SSB position indexes with the QCL relationship can be associated with the same PRACH resource. Therefore, a method for determining a random access resource according to an embodiment of the present application can avoid the above problem.

Figure 9:
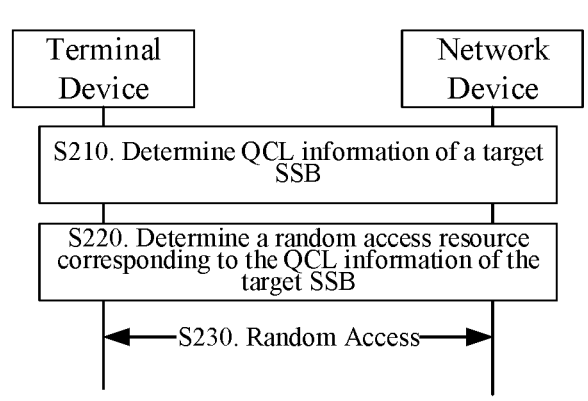
FIG. 9 is a flowchart illustrating a method for determining a random access resource according to an embodiment of the present application.

FIG. 9 is a flowchart illustrating a method 200 for determining a random access resource according to an embodiment of the present application. As illustrated in FIG. 9, the method 200 may include: S210, determining QCL information of a target SSB. Specifically, the method 200 may be executed by a terminal device and a network device. For example, the network device may be the network device as illustrated in FIG. 1, and the terminal device may be the terminal device as illustrated in FIG. 1. In S210, the terminal device and/or the network device may determine the QCL information of the target SSB. The target SSB may be any SSB.

The operation of determining the QCL information of the target SSB by the terminal device will be described first.

Optionally, as an embodiment, the operation of determining, by the terminal device, the QCL information of the target SSB may include determining, by the terminal device, the QCL information of the target SSB based on position information of the target SSB. Specifically, in an example where the QCL information of the target SSB includes a QCL index of the target SSB, the terminal device can determine the QCL index of the target SSB according to Equation (1):

$$QCL = \mod(P, Q) \qquad (1)$$

where QCL represents the QCL index of the target SSB, P represents the position index of the target SSB, and Q represents a parameter used to determine the QCL index of the target SSB. For example, Q may represent a maximum number of SSBs transmitted within a transmission window of a DRS that do not have a QCL relationship. Optionally, the parameter Q may be configured by the network device for the terminal device, or may be specified by the protocol, and this embodiment of the present application is not limited to any of these examples.

It can be appreciated that Equation (1) can be used to determine a relationship between the position index and the QCL index of the target SSB, and can also be used for calculation between the position index and the QCL index of any other SSB, and this embodiment of the present application is not limited in this regard.

It can be appreciated that the operation of determining, by the terminal device, the QCL information of the target SSB based on the position information of the target SSB may mean that the terminal device may also determine the position information of the target SSB before determining the QCL information of the target SSB.

Optionally, the operation of determining the position information of the target SSB by the terminal device may include detecting, by the terminal device, the target SSB to determine the position information of the target SSB. The position information of the target SSB may include the position index of the target SSB. For example, for a CBRA process, the terminal device may detect the position index of the target SSB. The position index of the target SSB represents a position at which the target SSB is received by the terminal device. Specifically, the terminal device detects the SSB, and when Reference Signal Receiving Power (RSRP) of the detected SSB meets a certain threshold, the terminal device can determine that the SSB is the target SSB based on the position index where the SSB is located, and determine the position index of the target SSB.

Optionally, the operation of determining the position information of the target SSB by the terminal device may alternatively include receiving, by the terminal device, the position information of the target SSB transmitted by the network device. The position information of the target SSB may include the position index of the target SSB. For example, for a CFRA process, the network device may transmit a PDCCH order to the terminal device for triggering the terminal device to perform the CFRA process. The PDCCH order may include the position information of the target SSB. For example, the position index of the target SSB may be included in the PDCCH order to facilitate the determining of the position index of the target SSB and the corresponding target SSB by the terminal device.

It can be appreciated that the value range of the position index of the target SSB according to an embodiment of the present application represents a possible transmission position of the target SSB. For example, a value range of the position index of the target SSB may be dependent on a size of the transmission window of the DRS that includes the target SSB; and/or the value range of the position index of the target SSB may also be dependent on the SCS.

For example, for FIG. 4 as an example, the size of the window of the DRS is 5 ms, and the SCS of the SSB is 30 kHz, then the number of possible transmission positions of the SSB is twenty. That is, the value range of the position index of the target SSB is 0-19. In another example, the size of the window of the DRS is 5 ms, and the SCS of the SSB is 15 kHz, then ten candidate positions are defined. That is, the number of possible transmission positions of the SSB is ten. That is, the value range of the position index of the target SSB is 0-9. The network device may select one or more transmission positions from, for example, the above twenty or ten possible transmission positions by means of LBT, to transmit one or more target SSBs. The position index of the target SSB included in the spatial relationship indication information may represent an index of a position at which the target SSB is actually transmitted, such that the terminal device can determine the position index of the target SSB and can also receive the target SSB.

It can be appreciated that the value range of the QCL index of the target SSB according to an embodiment of the present application is dependent on the maximum number (Q) of SSBs transmitted within one transmission window of the DRS that do not have the QCL relationship. For example, the value range of the QCL index of the target SSB may range from 0 to Q−1.

Optionally, as another embodiment, the operation of determining, by the terminal device, the QCL information of the target SSB can include receiving, by the terminal device, the QCL information of the target SSB transmitted by the network device. The QCL information may include the QCL index of the target SSB. For example, for a CFRA process, the network device may transmit a PDCCH order to the terminal device to trigger the terminal device to perform the CFRA process. The PDCCH order may include the QCL information of the target SSB. For example, the QCL index of the target SSB may be included in the PDCCH order to facilitate the determining of the QCL index of the target SSB by the terminal device.

Optionally, the value range of the QCL index of the target SSB may be dependent on the maximum number Q of SSBs transmitted within one transmission window of the DRS that do not have the QCL relationship. For example, the value range of the QCL index of the target SSB may range from 0 to Q−1.

In the following, the operation of determining the QCL information of the target SSB by the network device will be described.

Specifically, the network device may determine the position information of the target SSB and may also determine the QCL information of the target SSB based on the position information of the target SSB. For example, on an unlicensed frequency spectrum, the network device may determine the position information for transmitting the target SSB by means of LBT. The position information of the target SSB may include the position index of the target SSB.

According to the above description, due to the uncertainty in obtaining channel access on the unlicensed frequency spectrum, the network device may not be able to successfully transmit the SSB at the predetermined time due to the possibility of the LBT failure for transmission of the SSB. Therefore, the NR-U defines candidate positions of the SSB. That is, the value range of the position index of the target SSB represents possible transmission positions of the target SSB. For example, the value range of the position index of the target SSB may be dependent on the size of the transmission window of the DRS that includes the target SSB; and/or the value range of the position index of the target SSB may also be dependent on the SCS. For brevity, repeated description will be omitted here.

The network device can determine the position information of the target SSB and can determine the QCL information of the target SSB based on the position information of the target SSB. For example, the position information of the target SSB may include the position index of the target SSB. The QCL information of the target SSB may include the QCL index of the target SSB. Therefore, in accordance with Equation (1), the QCL information of the target SSB can be determined correspondingly based on the position index of the target SSB.

Optionally, the network device can determine the position information of the target SSB and the QCL information of the target SSB. The network device may transmit the position information of the target SSB and/or the QCL information of the target SSB to the terminal device. For example, for a CFRA process, the network device may transmit a PDCCH order to the terminal device to trigger the terminal device to perform the CFRA process. The PDCCH order may include the position information and/or the QCL information of the target SSB. For example, the QCL index of the target SSB may be included in the PDCCH order, such that the terminal device can determine the QCL index of the target SSB. In another example, the position index of the target SSB may be included in the PDCCH order, such that the terminal device can determine the position index of the target SSB, or further determine the QCL index of the corresponding target SSB based on the position index of the target SSB.

Optionally, the network device may further transmit the target SSB to the terminal device based on the determined position information of the target SSB and the determined QCL information of the target SSB, so as to facilitate receiving of the target SSB by the terminal device.

As illustrated in FIG. 9, the method 200 further includes: at S220, determining a random access resource corresponding to the QCL information of the target SSB. Specifically, the terminal device and/or the network device may determine a set of target random access resources corresponding to the QCL information of the target SSB based on a correspondence between QCL information of SSBs and sets of random access resources. In other words, a set of target random access resources corresponding to the target SSB is determined, and a random access resource in the set of target random access resources can be used for the terminal device and the network device to perform a random access process.

It can be appreciated that any set of random access resources according to an embodiment of the present application may include at least one random access resource. Any random access resource according to an embodiment of the present application may refer to a PRACH resource, which may include e.g., a PRACH occasion and/or a PRACH preamble.

For the purpose of illustration, the following description will be given with reference to an example in which the terminal device determines the set of target random access resources. The following description is also applicable to the network device. For brevity, repeated description will be omitted here.

The terminal device can determine one or more random access resources corresponding to the QCL information of the target SSB based on the correspondence between QCL information of SSBs and random access resources. That is, the set of target random access resources corresponding to the target SSB may be determined and the set of target random access resources may include the one or more random access resources. For example, the set of target random access resources may include available PRACH occasions and available preambles.

Optionally, in the correspondence between the QCL information of SSBs and the random access resources, SSBs with the QCL relationship may correspond to the same random access resource, and SSBs without QCL relationship may correspond to different random access resources. In addition, position information of the SSBs with the QCL relationship may be different. For example, as illustrated in FIG. 5, position indexes of the SSBs with the QCL relationship may be different. For example, SSBs with position indexes of 0, 8, and 16 have the QCL relationship.

Figure 10:
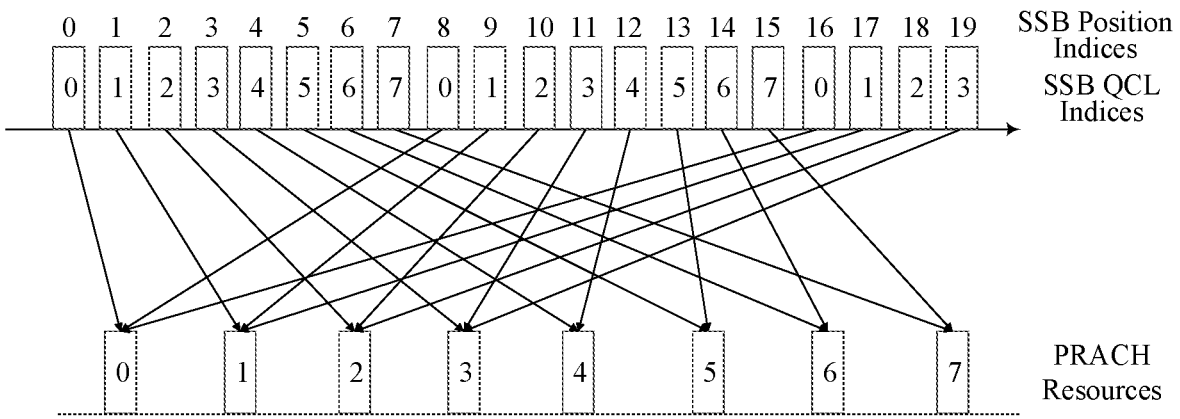
FIG. 10 is a schematic diagram illustrating a correspondence between different position indexes and QCL indexes and random access resources according to an embodiment of the present application.

For example, FIG. 10 illustrates a correspondence between different position indexes and QCL indexes and random access resources. As illustrated in FIG. 10, as an example, the value range of position indexes of SSBs is 0-19, and the value range of the QCL indexes of SSBs is 0-7, i.e., Q is equal to eight. Correspondingly, as an example, the random access resource may be PRACH and each numbered PRACH resource block in FIG. 10 may represent one set of PRACH resources. Each set of PRACH resources may include one or more random access resources.

As illustrated in FIG. 10, the position indexes of different SSBs may correspond to the same QCL index. The position indexes of SSBs corresponding to the same QCL index have the QCL relationship. The SSBs with the QCL relationship correspond to the same PRACH resource. For example, each of SSBs having position indexes of 1, 9, and 17 corresponds to a QCL index of 1, and corresponds to PRACH Resource 1.

The terminal device can determine the set of target random access resources corresponding to the QCL information of the target SSB based on the correspondence between the QCL indexes of SSBs and the random access resources as illustrated in FIG. 10. For example, assuming that the QCL index of the target SSB included in the QCL information of the target SSB is 2, a corresponding set of target random access resources may be PRACH Resource 2 as illustrated in FIG. 10.

Optionally, the correspondence between the QCL information of SSBs and the random access resources can be configured by the network device. For example, the network device can transmit a system message to the terminal device, and the correspondence between the QCL information of SSBs and the random access resources can be determined based on ssb-perRACH-OccasionAndCB-Preambles-PerSSB configured in the system message. Alternatively, the correspondence between the QCL information of SSBs and the random access resources can be predefined, e.g., specified by a protocol, and this embodiment of the present application is not limited to any of these examples.

Optionally, as illustrated in FIG. 9, the method 200 may further include: at S230, performing random access. The terminal device and the network device can determine the set of target random access resources in accordance with the above process. The terminal device and the network device can use a random access resource in the set of target random access resources to perform the random access.

For example, in a CBRA process, the terminal device may use a random access resource in the set of target random access resources to perform the random access. If the set of target random access resources includes a plurality of random access resources, e.g., the set of target random access resources includes a plurality of PRACH resources, the terminal device may randomly select a part of the plurality of PRACH resources to transmit the PRACH.

In another example, in a CFRA process, if the set of target random access resources includes a plurality of random access resources, the terminal device may also select, in accordance with an instruction from the network device, a part of the plurality of random access resources for the random access. For example, a PDCCH order transmitted by the network device to the terminal device may carry an indication index. For example, the indication index may be a PRACH Mask index, which indicates a part of random access resources in the set of target random access resources that are associated with the SSB QCL index of the SSB. For example, the indication index may indicate which of the PRACH occasions in the set of target random access resources is used for the random access process, such that the terminal device and the network device can perform a contention-free based random access process. For example, the terminal device can transmit a random access channel on the part of random access resources, and the network device receives the random access channel on the part of random access resources.

An object of the association relationship between the SSBs and the PRACH resources is to facilitate using a suitable beam by the base station to receive the PRACH transmitted by the terminal device based on reciprocity between uplink and downlink channels. There is an association relationship between the beam and a transmission beam of an associated SSB. If the SSB position index is directly associated with the PRACH resource, SSBs of the same beam transmitted at different SSB positions can be associated with different PRACH resources, thereby resulting in a waste and a degraded utilization rate of PRACH resources. Although the SSB position index has a relatively large range, the maximum number of actually transmitted SSBs that do not have the QCL relationship with each other is limited. In view of this, with the method for determining the random access resource according to the embodiment of the present application, the random access resource corresponding to a certain SSB can be determined based on the correspondence between the QCL information of SSBs and the random access resources, thereby avoiding the waste of resources.

Figure 11:
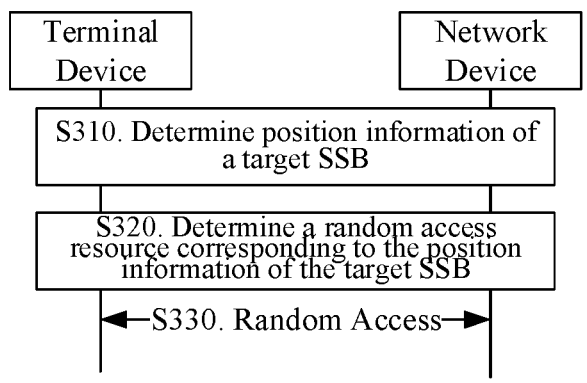
FIG. 11 is a flowchart illustrating another method for determining a random access resource according to an embodiment of the present application.

FIG. 11 is a flowchart illustrating another method 300 for determining a random access resource according to an embodiment of the present application. As illustrated in FIG. 11, the method 300 may include: S310, determining position information of a target SSB. Specifically, the method 300 may be performed by a terminal device and a network device. For example, the network device may be the network device as illustrated in FIG. 1, and the terminal device may be the terminal device as illustrated in FIG. 1. In S310, the terminal device and/or the network device may determine the position information of the target SSB. The target SSB may be any SSB.

It can be appreciated that the related description of S210 of the method 200 includes a process in which the terminal device and the network device determine the position information of the target SSB (including a position index of the target SSB). This part of the content is also applicable to a process in the method 300 in which the terminal device or the network device executes S310 to determine the position information of the target SSB. For brevity, repeated description will be omitted here.

As illustrated in FIG. 11, the method 300 further includes: S320, determining a random access resource corresponding to the position information of the target SSB. Specifically, the terminal device and/or the network device can determine a set of target random access resources corresponding to the position information of the target SSB based on the correspondence between position information of SSBs and sets of random access resources. In other words, a set of target random access resources corresponding to the target SSB is determined, and a random access resource in the set of target random access resources can be used for the terminal device and the network device to perform the random access process.

It can be appreciated that any set of random access resources according to an embodiment of the present application may include at least one random access resource. Any random access resource according to an embodiment of the present application may refer to a PRACH resource, which may include e.g., a PRACH occasion and/or a PRACH preamble.

For the purpose of illustration, the following description will be given with reference to an example in which the terminal device determines the set of target random access resources. The following description is also applicable to the network device. For brevity, repeated description will be omitted here.

The terminal device can determine one or more random access resources corresponding to the position information of the target SSB based on the correspondence between position information of SSBs and random access resources. That is, the set of target random access resources corresponding to the target SSB may be determined and the set of target random access resources may include the one or more random access resources. For example, the set of target random access resources may include available PRACH occasions and available preambles.

Optionally, in the correspondence between the position information of SSBs and the random access resources, SSBs with the QCL relationship may correspond to the same random access resource, and SSBs without QCL relationship may correspond to different random access resources. For example, as illustrated in FIG. 5, since position information of the SSBs with the QCL relationship may be different, position indexes of the SSBs with the QCL relationship may be different. For example, SSBs with position indexes of 0, 8, and 16 have the QCL relationship. Therefore, in the correspondence between the position information of SSBs and the random access resources, position indexes of a plurality of SSBs correspond to the same random access resource, and the plurality of SSBs have different position indexes and have the QCL relationship. For example, the plurality of SSBs may have the same QCL information, or in other words, have the same QCL index.

For example, referring again to FIG. 10, the value range of position indexes of SSBs is 0-19, and the value range of QCL indexes of SSBs is 0-7, i.e., Q is equal to eight. Correspondingly, as an example, the random access resource may be PRACH and each numbered PRACH resource block in FIG. 10 may represent one set of PRACH resources. Each set of PRACH resources may include one or more random access resources.

As illustrated in FIG. 10, the position indexes of different SSBs may correspond to the same QCL index. The position indexes of SSBs corresponding to the same QCL index have the QCL relationship. The SSBs with the QCL relationship correspond to the same PRACH resource. For example, each of SSBs having position indexes of 1, 9, and 17 corresponds to a QCL index of 1, and corresponds to PRACH Resource 1.

The terminal device can determine the set of target random access resources corresponding to the position information of the target SSB based on the correspondence between the position indexes of SSBs and the random access resources as illustrated in FIG. 10. For example, assuming that the position index of the target SSB included in the position information of the target SSB is 2, a corresponding set of target random access resources may be PRACH Resource 2 as illustrated in FIG. 10. Further, if the position index of the target SSB included in the position information of the target SSB is 10 or 18, the corresponding set of target random access resources may again be PRACH Resource 2 as illustrated in FIG. 10, and the SSBs with position indexes of 2, 10, and 18 have the QCL relationship. On the contrary, if the position index of the target SSB included in the position information of the target SSB is 13, the corresponding set of target random access resources may be PRACH Resource 5 as illustrated in FIG. 10. Since the position index 13 and the position index 2 do not have the QCL relationship, the position index 13 and the position index 2 do not correspond to the same PRACH resource.

Optionally, the correspondence between the position information of the SSBs and the random access resources can be configured by the network device. For example, the network device can transmit a system message to the terminal device, and the correspondence between the position information of the SSBs and the random access resources can be determined based on ssb-perRACH-OccasionAndCB-PreamblesPerSSB configured in the system message. Alternatively, the correspondence between the position information of SSBs and the random access resources can also be predefined, e.g., specified by a protocol, and this embodiment of the present application is not limited to any of these examples.

Optionally, as illustrated in FIG. 11, the method 300 may further include: S330, performing random access. The terminal device and the network device can determine the set of target random access resources in accordance with the above process. The terminal device and the network device can use a random access resource in the set of target random access resources to perform the random access.

It can be appreciated that S330 in the method 300 may correspond to S230 in the method 200. That is, the description of S230 is applicable to S330. For brevity, repeated description will be omitted here.

Therefore, with the method for determining a random access resource according to the embodiment of the present application, a random access resource corresponding to a certain SSB can be determined based on a correspondence between position information of SSBs and random access resources, such that the terminal device can determine a PRACH resource corresponding to an SSB position index directly based on the SSB position index and an association relationship between SSB position indexes and PRACH resources, e.g., an association relationship between the SSB position indexes and PRACH occasions and/or preambles, without having to calculate an SSB QCL index. In addition, in the association relationship, SSB position indexes with the same result of Mod (SSB position index, Q) are associated with the same PRACH resource. That is, SSBs with the QCL relationship are associated with the same PRACH resource, which can avoid a waste and a degraded utilization rate of the PRACH resources.

With any of the above technical solutions, a random access resource corresponding to a certain SSB can be determined based on a correspondence between QCL information of SSBs and random access resources. Alternatively, a random access resource corresponding to a certain SSB can be determined based on a correspondence between position information of SSBs and random access resources. In addition, in this association relationship, SSBs with a QCL relationship are associated with a same PRACH resource, which can avoid a waste and a degraded utilization rate of PRACH resources.

It can be appreciated that, in various embodiments of the present application, numerical values of sequence numbers in the above processes do not mean any order in which they are executed. The execution order of the processes should be determined by functions and internal logic of the processes. The numerical values should not constituent any limitation on the implementation process of the embodiments of the present application.

The methods for determining a random access resource according to the embodiments of the present application have been described in detail above with reference to FIG. 1 to FIG. 11. A terminal device and a network device according to embodiments of the present application will be described below with reference to FIG. 12 to FIG. 16.

Figure 12:
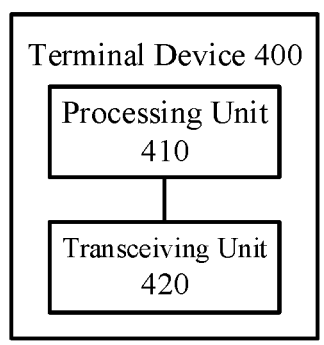
FIG. 12 is a block diagram illustrating a terminal device according to an embodiment of the present application.

As illustrated in FIG. 12, a terminal device 400 according to an embodiment of the present application includes a processing unit 410 and a transceiving unit 420. Optionally, the terminal device 400 may be configured to perform the method 200. Specifically, the processing unit 410 may be configured to determine QCL information of a target SSB. The processing unit 410 may be further configured to determine a set of target random access resources corresponding to the QCL information of the target SSB based on a correspondence between QCL information of SSBs and sets of random access resources. A random access resource in the set of target random access resources is used to perform a random access process.

Optionally, as an embodiment, each of the random access resources may include a PRACH occasion and a PRACH preamble.

Optionally, as an embodiment, the processing unit 410 may be configured to determine the QCL information of the target SSB based on a position index of the target SSB.

Optionally, as an embodiment, the processing unit 410 may be configured to determine a QCL index of the target SSB according to Equation (1), where QCL represents the QCL index of the target SSB, P represents the position index of the target SSB, and Q represents a maximum number of SSBs transmitted within a transmission window of a DRS that do not have a QCL relationship. The QCL information of the target SSB may include the QCL index of the target SSB.

Optionally, as an embodiment, the processing unit 410 may be further configured to detect the target SSB to determine the position index of the target SSB.

Optionally, as an embodiment, the transceiving unit 420 may be configured to receive the position index of the target SSB transmitted by a network device.

Optionally, as an embodiment, the transceiving unit 420 may be configured to receive PDCCH order information transmitted by the network device. The PDCCH order information includes the position index of the target SSB.

Optionally, as an embodiment, a value range of the position index of the target SSB may be dependent on a size of the transmission window of the DRS, and the DRS may include the target SSB; and/or the value range of the position index of the target SSB may be dependent on an SCS of a synchronization signal.

Optionally, as an embodiment, the transceiving unit 420 may be configured to receive the QCL information of the target SSB transmitted by a network device.

Optionally, as an embodiment, the transceiving unit 420 may be configured to receive PDCCH order information transmitted by the network device. The PDCCH order information may include the QCL information of the target SSB.

Optionally, as an embodiment, the PDCCH order information may be used to trigger the processing unit 410 to initiate a contention-free based random access process.

Optionally, as an embodiment, the PDCCH order information may further include an indication index. The processing unit 410 may be configured to: determine a target random access resource in the set of target random access resources based on the indication index; and perform the contention-free based random access process with the network device using the target random access resource.

It can be appreciated that the above and other operations and/or functions of the respective units in the terminal device 400 are used to implement corresponding processes performed by the terminal device in the method 200 illustrated in FIG. 1 to FIG. 10. For brevity, repeated description will be omitted here.

Therefore, the terminal device according to an embodiment of the present application can determine a random access resource corresponding to a certain SSB based on the correspondence between the QCL information of SSBs and the random access resources, thereby avoiding a waste of resources.

Optionally, the terminal device 400 may be configured to perform the method 300. Specifically, the processing unit 410 may be configured to determine a position index of a target SSB. The processing unit 410 may be further configured to determine a set of target random access resources corresponding to the position index of the target SSB based on a correspondence between position indexes of SSBs and sets of random access resources. A random access resource in the set of target random access resources may be used to perform a random access process. The position indexes of at least two SSBs may correspond to one set of random access resources in the correspondence. The at least two SSBs may have a QCL relationship.

Optionally, as an embodiment, each of the random access resources may include a PRACH occasion and a PRACH preamble.

Optionally, as an embodiment, a value range of the position index of the target SSB may be dependent on a size of a transmission window of a DRS, and the DRS may include the target SSB; and/or the value range of the position index of the target SSB may be dependent on an SCS of a synchronization signal.

Optionally, as an embodiment, the processing unit 410 may be configured to detect the target SSB to determine the position index of the target SSB.

Optionally, as an embodiment, the transceiving unit 420 may be configured to receive the position index of the target SSB transmitted by a network device.

Optionally, as an embodiment, the transceiving unit 420 may be configured to receive PDCCH order information transmitted by the network device. The PDCCH order information includes the position index of the target SSB.

Optionally, as an embodiment, the PDCCH order information may be used to trigger the processing unit 410 to initiate a contention-free based random access process.

Optionally, as an embodiment, the PDCCH order information may further include an indication index. The processing unit 410 may be configured to: determine a target random access resource in the set of target random access resources based on the indication index; and perform the contention-free based random access process using the target random access resource.

Optionally, as an embodiment, a first SSB and a second SSB may have the QCL relationship when a QCL index corresponding to a position index of the first SSB in the correspondence is equal to a QCL index corresponding to a position index of the second SSB in the correspondence.

Optionally, as an embodiment, the processing unit 410 may be configured to determine the QCL index corresponding to the position index of the first SSB according to Equation (1), where QCL represents the QCL index of the first SSB, P represents the position index of the first SSB, and Q represents a maximum number of SSBs transmitted within a transmission window of the DRS that do not have the QCL relationship.

It can be appreciated that the above and other operations and/or functions of the respective units in the terminal device 400 are used to implement corresponding processes performed by the terminal device in the method 300 illustrated in FIG. 1 to FIG. 11. For brevity, repeated description will be omitted here.

Therefore, with the terminal device according to an embodiment of the present application, the random access resource corresponding to a certain SSB can be determined based on the correspondence between the position information of the SSBs and the random access resources, such that the terminal device can determine the PRACH resource corresponding to the SSB position index directly based on the SSB position index and the association relationship between the SSB position indexes and the PRACH resources, without having to calculate an SSB QCL index. In addition, SSBs with the QCL relationship are associated with the same PRACH resource, which can avoid a waste and a degraded utilization rate of the PRACH resources.

With any of the above technical solutions, a random access resource corresponding to a certain SSB can be determined based on a correspondence between QCL information of SSBs and random access resources. Alternatively, a random access resource corresponding to a certain SSB can be determined based on a correspondence between position information of SSBs and random access resources. In addition, in this association relationship, SSBs with a QCL relationship are associated with a same PRACH resource, which can avoid a waste and a degraded utilization rate of PRACH resources.

Figure 13:
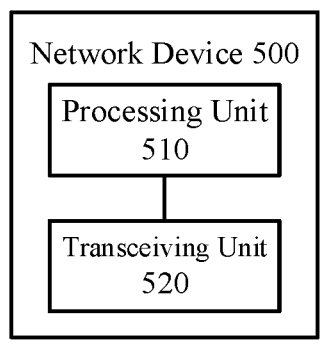
FIG. 13 is a block diagram illustrating a network device according to an embodiment of the present application.

As illustrated in FIG. 13, a network device 500 according to an embodiment of the present application includes a processing unit 510 and a transceiving unit 520. Optionally, the network device 500 may be configured to perform the method 200. Specifically, the processing unit 510 may be configured to determine QCL information of a target SSB. The processing unit 510 may be further configured to determine a set of target random access resources corresponding to the QCL information of the target SSB based on a correspondence between QCL information of SSBs and sets of random access resources. A random access resource in the set of target random access resources may be used by the transceiving unit 520 to receive a RACH.

Optionally, as an embodiment, each of the random access resources may include a PRACH occasion and a PRACH preamble.

Optionally, as an embodiment, the processing unit 510 may be configured to determine the QCL information of the target SSB based on a position index of the target SSB.

Optionally, as an embodiment, the processing unit 510 may be configured to determine a QCL index of the target SSB according to Equation (1), where QCL represents the QCL index of the target SSB, P represents the position index of the target SSB, and Q represents a maximum number of SSBs transmitted within a transmission window of a DRS that do not have a QCL relationship. The QCL information of the target SSB may include the QCL index of the target SSB.

Optionally, as an embodiment, the processing unit 510 may be configured to determine the position index of the target SSB by means of LBT.

Optionally, as an embodiment, a value range of the position index of the target SSB may be dependent on a size of the transmission window of the DRS, and the DRS may include the target SSB; and/or the value range of the position index of the target SSB may be dependent on an SCS of a synchronization signal.

Optionally, as an embodiment, the transceiving unit 520 may be further configured to transmit the target SSB to the terminal device based on the position index of the target SSB.

Optionally, as an embodiment, the transceiving unit 520 may be further configured to transmit the position index of the target SSB to the terminal device.

Optionally, as an embodiment, the transceiving unit 520 may be configured to transmit PDCCH order information to the terminal device. The PDCCH order information may include the position index of the target SSB.

Optionally, as an embodiment, the transceiving unit 520 may be further configured to transmit the QCL information of the target SSB to the terminal device.

Optionally, as an embodiment, the transceiving unit 520 may be configured to transmit PDCCH order information to the terminal device. The PDCCH order information may include the QCL information of the target SSB.

Optionally, as an embodiment, the PDCCH order information may be used to trigger the terminal device to initiate a contention-free based random access process.

Optionally, as an embodiment, the PDCCH order information may further include an indication index. The processing unit 510 may be configured to: determine a target random access resource in the set of target random access resources based on the indication index; and perform the contention-free based random access process with the terminal device using the target random access resource.

It should be understood that the above and other operations and/or functions of the respective units in the network device 500 are used to implement corresponding processes performed by the network device in the method 200 illustrated in FIG. 1 to FIG. 11. For brevity, repeated description will be omitted here.

Therefore, the network device according to an embodiment of the present application determines and indicates to the terminal device a random access resource corresponding to a certain SSB based on the correspondence between the QCL information of SSBs and the random access resources, thereby avoiding a waste of resources.

Optionally, the network device 500 can be further configured to perform the method 300. Specifically, the processing unit 510 may be configured to determine a position index of a target SSB. The processing unit 510 is further configured to determine a set of target random access resources corresponding to the position index of the target SSB based on a correspondence between position indexes of SSBs and sets of random access resources. A random access resource in the set of target random access resources may be used by the transceiving unit 520 to receive a RACH. The position indexes of at least two SSBs may correspond to one set of random access resources in the correspondence. The at least two SSBs have a QCL relationship.

Optionally, as an embodiment, each of the random access resources may include a PRACH occasion and a PRACH preamble.

Optionally, as an embodiment, a value range of the position index of the target SSB may be dependent on a size of a transmission window of a DRS, and the DRS may include the target SSB; and/or the value range of the position index of the target SSB may be dependent on an SCS of a synchronization signal.

Optionally, as an embodiment, the transceiving unit 520 may be further configured to transmit the target SSB to the terminal device based on the position index of the target SSB.

Optionally, as an embodiment, the transceiving unit 520 may be further configured to transmit the position index of the target SSB to the terminal device.

Optionally, as an embodiment, the transceiving unit 520 may be configured to transmit PDCCH order information to the terminal device. The PDCCH order information includes the position index of the target SSB.

Optionally, as an embodiment, the PDCCH order information may be used to trigger the terminal device to initiate a contention-free based random access process.

Optionally, as an embodiment, the PDCCH order information may further include an indication index. The processing unit 510 may be configured to: determine a target random access resource in the set of target random access resources based on the indication index; and perform the contention-free based random access process with the terminal device using the target random access resource.

Optionally, as an embodiment, a first SSB and a second SSB may have the QCL relationship when a QCL index corresponding to a position index of the first SSB in the correspondence is equal to a QCL index corresponding to a position index of the second SSB in the correspondence.

Optionally, as an embodiment, the processing unit 510 may be configured to determine the QCL index corresponding to the position index of the first SSB according to Equation (1), where QCL represents the QCL index of the first SSB, P represents the position index of the first SSB, and Q represents a maximum number of SSBs transmitted within a transmission window of the DRS that do not have the QCL relationship.

It can be appreciated that the above and other operations and/or functions of the respective units in the network device 500 are used to implement corresponding processes performed by the network device in the method illustrated in FIG. 1 to FIG. 11. For brevity, repeated description will be omitted here.

Therefore, with the network device according to an embodiment of the present application, the random access resource corresponding to a certain SSB can be determined based on the correspondence between the position information of the SSBs and the random access resources, such that the network device can determine the PRACH resource corresponding to the SSB position index directly based on the SSB position index and the association relationship between the SSB position indexes and the PRACH resources, without having to calculate an SSB QCL index. In addition, SSBs with the QCL relationship are associated with the same PRACH resource, which can avoid a waste and a degraded utilization rate of the PRACH resources.

With any of the above technical solutions, a random access resource corresponding to a certain SSB can be determined based on a correspondence between QCL information of SSBs and random access resources. Alternatively, a random access resource corresponding to a certain SSB can be determined based on a correspondence between position information of SSBs and random access resources. In addition, in this association relationship, SSBs with a QCL relationship are associated with a same PRACH resource, which can avoid a waste and a degraded utilization rate of PRACH resources.

Figure 14:
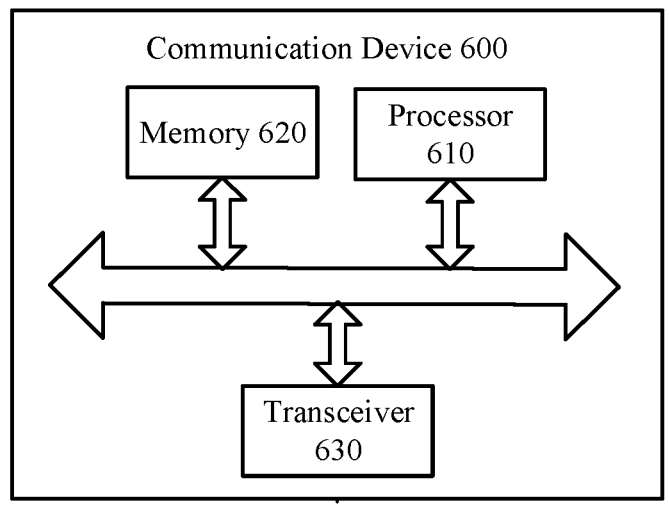
FIG. 14 is a block diagram illustrating a communication device according to an embodiment of the present application.

FIG. 14 is a schematic diagram showing a structure of a communication device 600 according to an embodiment of the present application. The communication device 600 shown in FIG. 14 includes a processor 610, and the processor 610 can invoke and execute a computer program from a memory to perform the method according to any of the embodiments of the present application.

Optionally, as shown in FIG. 14, the communication device 600 may further include a memory 620. The processor 610 can invoke and execute a computer program from the memory 620 to perform the method according to any of the embodiments of the present application.

The memory 620 may be a separate device independent of the processor 610, or may be integrated in the processor 610.

Optionally, as shown in FIG. 14, the communication device 600 may further include a transceiver 630. The processor 610 can control the transceiver 630 to communicate with other devices, and in particular to transmit information or data to other devices or receive information or data transmitted by other devices.

Here, the transceiver 630 may include a transmitter and a receiver. The transceiver 830 may further include one or more antennas.

Optionally, the communication device 600 may be the network device in the embodiment of the present application, and the communication device 600 can perform corresponding procedures implemented by the network device in the method according to any of the embodiments of the present application. Details thereof will be omitted here for simplicity.

Optionally, the communication device 800 may be the mobile terminal/terminal device in the embodiment of the present application, and the communication device 800 can perform corresponding procedures implemented by the mobile terminal/terminal device in the method according to any of the embodiments of the present application. Details thereof will be omitted here for simplicity.

Figure 15:
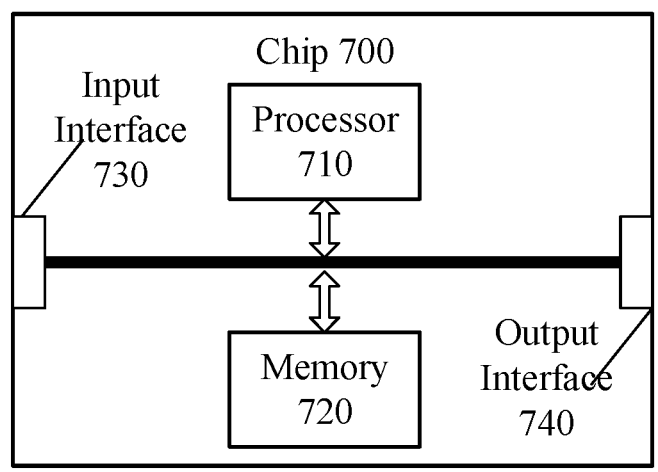
FIG. 15 is a block diagram illustrating a chip according to an embodiment of the present application.

FIG. 15 is a schematic diagram showing a structure of a chip according to an embodiment of the present application. The chip 700 shown in FIG. 14 includes a processor 710, and the processor 710 can invoke and run a computer program from a memory to implement the method in the embodiment of the present application.

Optionally, as shown in FIG. 15, the chip 700 may further include a memory 720. The processor 710 can invoke and run a computer program from the memory 720 to implement the method in the embodiment of the present application.

The memory 720 may be a separate device independent from the processor 710, or may be integrated in the processor 710.

Optionally, the chip 700 may further include an input interface 730. The processor 910 can control the input interface 730 to communicate with other devices or chips, and in particular, obtain information or data transmitted by other devices or chips.

Optionally, the chip 700 may further include an output interface 740. The processor 910 can control the output interface 740 to communicate with other devices or chips, and in particular, output information or data to other devices or chips.

Optionally, the chip can be applied to the network device in the embodiment of the present application, and the chip can implement the corresponding processes implemented by the network device in the various methods of the embodiments of the present application. For the sake of brevity, details thereof will be omitted here.

Optionally, the chip can be applied to the mobile terminal/terminal device in the embodiment of the present application, and the chip can implement the corresponding process implemented by the mobile terminal/terminal device in each method of the embodiment of the present application. For the sake of brevity, details thereof will be omitted here.

It can be appreciated that the chip in the embodiment of the present application may be a chip, and the chip may also be referred to as a system-level chip, a system-chip, a chip system, or a system-on-chip.

Figure 16:
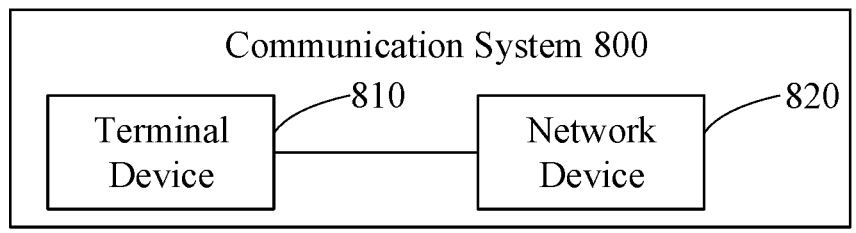
FIG. 16 is a block diagram illustrating a communication system according to an embodiment of the present application.

FIG. 16 is a schematic block diagram of a communication system 800 according to an embodiment of the present application. As shown in FIG. 16, the communication system 1000 includes a terminal device 810 and a network device 820.

Here, the terminal device 810 can be configured to implement the corresponding functions implemented by the terminal device in the above method, and the network device 820 can be configured to implement the corresponding functions implemented by the network device in the above method. For the sake of brevity, details thereof will be omitted here.

It is to be noted that the processor in the embodiment of the present application may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present application can be implemented or performed. The general purpose processor may be a microprocessor or any conventional processor. The steps of the methods disclosed in the embodiments of the present application may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present application may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present application is intended to include, but not limited to, these and any other suitable types of memories.

It can be appreciated that the above memories are exemplary only, rather than limiting the present application. For example, the memory in the embodiment of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present application is intended to include, but not limited to, these and any other suitable types of memories.

An embodiment of the present application also provides a computer readable storage medium for storing a computer program.

Optionally, the computer readable storage medium can be applied to the network device in the embodiment of the present application, and the computer program can cause a computer to perform corresponding procedures implemented by the network device in the method according to any of the embodiments of the present application. Details thereof will be omitted here for simplicity.

Optionally, the computer readable storage medium can be applied to the mobile terminal/terminal device in the embodiment of the present application, and the computer program can cause a computer to perform corresponding procedures implemented by the mobile terminal/terminal device in the method according to any of the embodiments of the present application. Details thereof will be omitted here for simplicity.

An embodiment of the present application also provides a computer program product including computer program instructions.

Optionally, the computer program product can be applied to the network device in the embodiment of the present application, and the computer program instructions can cause a computer to perform corresponding procedures implemented by the network device in the method according to any of the embodiments of the present application. Details thereof will be omitted here for simplicity.

Optionally, the computer program product can be applied to the mobile terminal/terminal device in the embodiment of the present application, and the computer program instructions can cause a computer to perform corresponding procedures implemented by the mobile terminal/terminal device in the method according to any of the embodiments of the present application. Details thereof will be omitted here for simplicity.

An embodiment of the present application also provides a computer program.

Optionally, the computer program can be applied to the network device in the embodiment of the present application. The computer program, when executed on a computer, can cause the computer to perform corresponding procedures implemented by the network device in the method according to any of the embodiments of the present application. Details thereof will be omitted here for simplicity.

Optionally, the computer program can be applied to the mobile terminal/terminal device in the embodiment of the present application. The computer program, when executed on a computer, can cause the computer to perform corresponding procedures implemented by the mobile terminal/terminal device in the method according to any of the embodiments of the present application. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this application.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present application, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present application may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present application, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present application. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present application have been described above, the scope of the present application is not limited to these embodiments. Various variants and alternatives can be made by those skilled in the art without departing from the scope of the present application. These variants and alternatives are to be encompassed by the scope of present application as defined by the claims as attached.

What is claimed is:

1. A method for determining a random access resource, comprising:
   determining, by a terminal device, Quasi Co-Located (QCL) information of a target Synchronization Signal Block (SSB); and
   determining, by the terminal device, a set of target random access resources corresponding to the QCL information of the target SSB based on a correspondence between QCL information of SSBs and sets of random access resources, wherein a random access resource in the set of target random access resources is used for the terminal device to perform a random access process,
   wherein said determining, by the terminal device, the QCL information of the target SSB comprises:
   determining, by the terminal device, the QCL information of the target SSB based on a position index of the target SSB and a parameter Q, wherein the parameter Q represents a maximum number of SSBs transmitted within a transmission window of a Discovery Reference Signal (DRS), and the SSBs transmitted within the transmission window of the Discovery Reference Signal (DRS) do not have a QCL relationship.

2. The method according to claim 1, wherein the random access resource comprises a Physical Random Access Channel (PRACH) occasion and a PRACH preamble.

3. The method according to claim 1, wherein the QCL information of the target SSB comprises a QCL index of the target SSB;
said determining, by the terminal device, the QCL information of the target SSB based on the position index of the target SSB and the parameter Q comprises:
determining, by the terminal device, the QCL index of the target SSB according to Equation:

$$QCL = \mod(P, Q) \qquad (1)$$

where QCL represents the QCL index of the target SSB, P represents the position index of the target SSB.

4. The method according to claim 1, further comprising:
detecting, by the terminal device, the target SSB to determine the position index of the target SSB.

5. The method according to claim 1, wherein a value range of the position index of the target SSB is dependent on a Subcarrier Spacing (SCS) of a synchronization signal.

6. A method for determining a random access resource, comprising:
determining, by a network device, Quasi Co-Located (QCL) information of a target Synchronization Signal Block (SSB); and
determining, by the network device, a set of target random access resources corresponding to the QCL information of the target SSB based on a correspondence between QCL information of SSBs and sets of random access resources, wherein a random access resource in the set of target random access resources is used for the network device to receive a Random Access Channel (RACH),
wherein said determining, by the network device, the QCL information of the target SSB comprises:
determining, by the network device, the QCL information of the target SSB based on a position index of the target SSB and a parameter Q, wherein the parameter Q represents a maximum number of SSBs transmitted within a transmission window of a Discovery Reference Signal (DRS), and the SSBs transmitted within the transmission window of the Discovery Reference Signal (DRS) do not have a QCL relationship.

7. The method according to claim 6, wherein the random access resource comprises a Physical Random Access Channel (PRACH) occasion and a PRACH preamble.

8. The method according to claim 6, wherein the QCL information of the target SSB comprises a QCL index of the target SSB;
said determining, by the network device, the QCL information of the target SSB based on the position index of the target SSB and the parameter Q comprises:
determining, by the network device, the QCL index of the target SSB according to Equation:

$$QCL = \mod(P, Q) \qquad (1)$$

where QCL represents the QCL index of the target SSB, P represents the position index of the target SSB.

9. The method according to claim 6, wherein a value range of the position index of the target SSB is dependent on a Subcarrier Spacing (SCS) of a synchronization signal.

10. The method according to claim 6, further comprising:
transmitting, by the network device, the position index of the target SSB to the terminal device.

11. A terminal device, comprising:
a processor; and
a memory,
wherein the memory is configured to store a computer program, and the processor is configured to invoke and run the computer program stored in the memory to:
determine Quasi Co-Located (QCL) information of a target Synchronization Signal Block (SSB); and
determine a set of target random access resources corresponding to the QCL information of the target SSB based on a correspondence between QCL information of SSBs and sets of random access resources, wherein a random access resource in the set of target random access resources is used for the terminal device to perform a random access process,
wherein the processor is further configured to invoke and run the computer program stored in the memory to determine the QCL information of the target SSB based on a position index of the target SSB and a parameter Q, wherein the parameter Q represents a maximum number of SSBs transmitted within a transmission window of a Discovery Reference Signal (DRS), and the SSBs transmitted within the transmission window of the Discovery Reference Signal (DRS) do not have a QCL relationship.

12. The terminal device according to claim 11, wherein the random access resource comprises a Physical Random Access Channel (PRACH) occasion and a PRACH preamble.

13. The terminal device according to claim 11, wherein the QCL information of the target SSB comprises a QCL index of the target SSB;
the processor is further configured to invoke and run the computer program stored in the memory to:
determine the QCL index of the target SSB according to Equation:

$$QCL = \mod(P, Q) \qquad (1)$$

where QCL represents the QCL index of the target SSB, P represents the position index of the target SSB.

14. The terminal device according to claim 11, wherein the processor is further configured to invoke and run the computer program stored in the memory to:
detect the target SSB to determine the position index of the target SSB.

15. The terminal device according to claim 11, wherein a value range of the position index of the target SSB is dependent on a Subcarrier Spacing (SCS) of a synchronization signal.

16. A network device, comprising:
a processor; and
a memory, wherein the memory is configured to store a computer program, and the processor is configured to invoke and run the computer program stored in the memory to:
determine Quasi Co-Located (QCL) information of a target Synchronization Signal Block (SSB); and
determine a set of target random access resources corresponding to the QCL information of the target SSB based on a correspondence between QCL information of SSBs and sets of random access resources, wherein a random access resource in the set of target random access resources is used for the network device to receive a Random Access Channel (RACH), wherein the computer program invoked and run by the processor to determine the QCL information of the target SSB further causes the processor to invoke and run the computer program stored in the memory to:

determine the QCL information of the target SSB based on a position index of the target SSB and a parameter Q, wherein the parameter Q represents a maximum number of SSBs transmitted within a transmission window of a Discovery Reference Signal (DRS), and the SSBs transmitted within the transmission window of the Discovery Reference Signal (DRS) do not have a QCL relationship.

17. The network device according to claim 16, wherein the random access resource comprises a Physical Random Access Channel (PRACH) occasion and a PRACH preamble.

18. The network device according to claim 16, wherein the QCL information of the target SSB comprises a QCL index of the target SSB;

the processor is further configured to invoke and run the computer program stored in the memory to:

determine the QCL index of the target SSB according to Equation:

$$QCL = \mod(P, Q) \qquad (1)$$

where QCL represents the QCL index of the target SSB, P represents the position index of the target SSB.

19. The network device according to claim 16, wherein a value range of the position index of the target SSB is dependent on a Subcarrier Spacing (SCS) of a synchronization signal.

20. The network device according to claim 16, wherein the processor is further configured to invoke and run the computer program stored in the memory to:

transmit the position index of the target SSB to the terminal device.

* * * * *